(12) United States Patent
Hecht

(10) Patent No.: US 8,479,622 B2
(45) Date of Patent: Jul. 9, 2013

(54) CUTTING TOOL ASSEMBLY AND TOOL HOLDER THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 740 days.

(21) Appl. No.: 12/751,735

(22) Filed: Mar. 31, 2010

(65) Prior Publication Data

US 2010/0254774 A1   Oct. 7, 2010

(30) Foreign Application Priority Data

Apr. 5, 2009  (IL) ............................................ 197899

(51) Int. Cl.
*B23B 29/02* (2006.01)
*B23B 29/04* (2006.01)

(52) U.S. Cl.
USPC ............. 82/158; 407/101; 407/102; 408/226; 408/239 R

(58) Field of Classification Search
USPC .................. 407/103, 101, 102; 408/226, 231, 408/239 R; 82/158, 159
See application file for complete search history.

(56) References Cited

U.S. PATENT DOCUMENTS

| 2,924,129 | A | * | 2/1960 | Munro | 408/187 |
| 3,002,405 | A | * | 10/1961 | Heftler | 408/197 |
| 3,289,273 | A | | 12/1966 | Artaud | |
| 4,102,591 | A | * | 7/1978 | Alcorn | 407/100 |
| 5,555,784 | A | * | 9/1996 | Muendlein et al. | 82/158 |
| 5,607,263 | A | | 3/1997 | Nespeta et al. | |
| 6,059,492 | A | * | 5/2000 | Hecht | 408/144 |
| 6,880,437 | B2 | * | 4/2005 | Sjoo et al. | 82/158 |
| 6,974,281 | B2 | * | 12/2005 | Hansson et al. | 407/66 |
| 7,240,593 | B2 | * | 7/2007 | Little | 82/1.11 |
| RE40,297 | E | * | 5/2008 | Berglund et al. | 408/1 R |
| 8,137,034 | B2 | * | 3/2012 | Noureddine | 407/11 |
| 2003/0059264 | A1 | | 3/2003 | Hansson et al. | |
| 2006/0210365 | A1 | * | 9/2006 | Hecht | 407/103 |

FOREIGN PATENT DOCUMENTS

| DE | 34 48 086 | 12/1991 |
| EP | 1 413 374 | 4/2004 |

OTHER PUBLICATIONS

International Search Report in PCT/IL2010/000196, dated Aug. 5, 2010.

* cited by examiner

*Primary Examiner* — Will Fridie, Jr.
(74) *Attorney, Agent, or Firm* — Womble Carlyle

(57) ABSTRACT

A cutting tool assembly for boring and internal grooving operations includes a tool head having a removably secured cutting insert at a forward insert receiving end and a rear mating end with a male or female type tool holder coupler in the form of an engagement protrusion or cutting holder receiving pocket. The tool head is fixed to a tool holder with a front mating end having a female or male tool head coupler in the form of a tool head receiving pocket or engagement protrusion. Following assembly, at least three abutting wall surfaces and an adjacent support surface of the tool holder coupler are in contact with at least three non-coplanar abutment surfaces and an adjacent supporting surface of the tool head coupler, respectively, and a fastening screw member extends through a through bore in the tool holder coupler engaging a threaded screw bore in the tool head coupler.

26 Claims, 8 Drawing Sheets

CUTTING TOOL ASSEMBLY AND TOOL HOLDER THEREFOR

FIELD OF THE INVENTION

The present invention relates to a cutting tool assembly comprising a tool holder and tool head for use in metal cutting processes in general, and for boring and internal grooving operations in particular.

BACKGROUND OF THE INVENTION

Within the field of internal grooving and boring of a rotating metal workpiece, cutting inserts manufactured from a hard material, namely cemented carbide, may be secured to a tool holder in many different ways.

U.S. Pat. No. 3,289,273 discloses a cutting tool assembly comprising a tool holder with a longitudinal axis and a removable tool head having a solid carbide cutting insert brazed onto the tool head. The tool holder includes a seat with a dovetailed groove having two side surfaces inclined at an acute angle to the seat surface, and the tool head includes a seating surface with a dovetailed slide member having two complementary side surfaces, where each of these surfaces is accurately machined so that the tool head will be automatically oriented in a direction along the longitudinal axis when mounting the tool head onto the tool holder. The slide member is slid into the groove to a position where a threaded orifice in the tool holder is approximately aligned with a tapered recess in the tool head, before a set screw within the threaded orifice is tightened against the tapered recess to complete the orientation of the tool holder in a direction perpendicular to the longitudinal axis.

This cutting tool assembly attempts to provide a swift and accurate means for re-orienting the tool head following removal from the tool holder, although it is suggested that there may be difficulties initially locating the slide member within the dovetail groove. A disadvantage of the first embodiment of this cutting tool assembly is that a major cutting force component tangential to a rotating workpiece is directed generally perpendicular to and away from the tool holder seat surface.

U.S. Pat. No. 4,102,591 discloses a cutting tool comprising a tool holder with a longitudinal axis and a solid carbide cutting insert with a cantilevered cutting portion removably secured within the tool holder. An outer end portion of the tool holder includes a recess with a flat bottom surface inclined at approximately 45° to the longitudinal axis and a side surface perpendicular to the bottom surface. The cutting insert also has perpendicular bottom and side surfaces which are positioned against the bottom and side surfaces of the recess, respectively, and a sloping side surface which is positioned opposite and at an acute angle to the bottom and side surfaces of the recess. A retaining screw interfacing with a threaded opening perpendicular to the bottom surface of the recess has a head which is tightened against the sloping side surface of the cutting insert to direct clamping force components towards the bottom and side surfaces of the recess. Also, during a cutting operation, cutting forces acting on the cutting end portion of the cutting insert are directed towards the bottom and side surfaces of the recess.

This cutting tool employs a relatively large solid carbide cutting insert providing both a means of attachment to the tool holder and a single cutting end portion, which is disadvantageous when considering the relative expense of solid carbide tooling.

U.S. Pat. No. 7,240,593 discloses a cutting apparatus comprising a bar device mount of primarily cylindrical shape with a longitudinal axis and a detachably fastened tool head with a pocket that receives a cutting insert. The bar device mount has a front mating end perpendicular to the longitudinal axis with a projection having two long vertical surfaces and 45° inclined top and bottom surfaces, each parallel to the longitudinal axis. The tool head has a rear mating end with a recess which is located on the projection by interfitting surfaces and fastened by a head screw engaged within a screw-receiving orifice shared by the head and mount and inclined at an acute angle to the longitudinal axis.

This invention has a disadvantage in that the cutting apparatus provides only moderate precision of tool head positioning relative to the mount in a vertical direction. Another disadvantage is the possibility that the tool head may easily separate and fall from the mount when the head screw is removed.

SUMMARY OF THE INVENTION

In accordance with embodiments of the present invention, there is provided a cutting tool assembly for machining a workpiece comprising:
   a tool holder having a longitudinal axis extending in a forward to rearward direction having a peripheral outer surface and a front mating end, and
   a tool head having a rear mating end and a forward insert receiving end with a cutting insert removably secured therein,
   the front mating end of the tool holder comprising:
   a male or female type tool head coupler having a threaded screw bore therein with a central axis, and a plurality of abutment wall surfaces adjacent a planar supporting surface,
   the rear mating end of the tool head comprising:
   a male or female type tool holder coupler having a through bore therein, and a plurality of adjacent abutting wall surfaces adjacent a planar support surface,
   wherein the support surface is in contact with the supporting surface, at least three of the plurality of abutting wall surfaces are in contact with at least three of the plurality of abutment wall surfaces, and a fastening screw member extends through the through bore and engages the threaded screw bore,
   and wherein the at least three of the plurality of abutment wall surfaces are non-coplanar and inclined at an acute third angle with a major plane intersecting the longitudinal axis, when viewed in a direction of the supporting surface.

Also in accordance with embodiments of the present invention, there is provided a tool holder having a longitudinal axis extending in a forward to rearward direction having a peripheral outer surface and a front mating end,
   the front mating end of the tool holder comprising:
   a male or female type tool head coupler having a threaded screw bore therein, and a plurality of abutment wall surfaces adjacent a planar supporting surface,
   wherein at least three of the plurality of abutment wall surfaces are non-coplanar and inclined at an acute third angle with a major plane intersecting the longitudinal axis, when viewed in a direction of the supporting surface.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
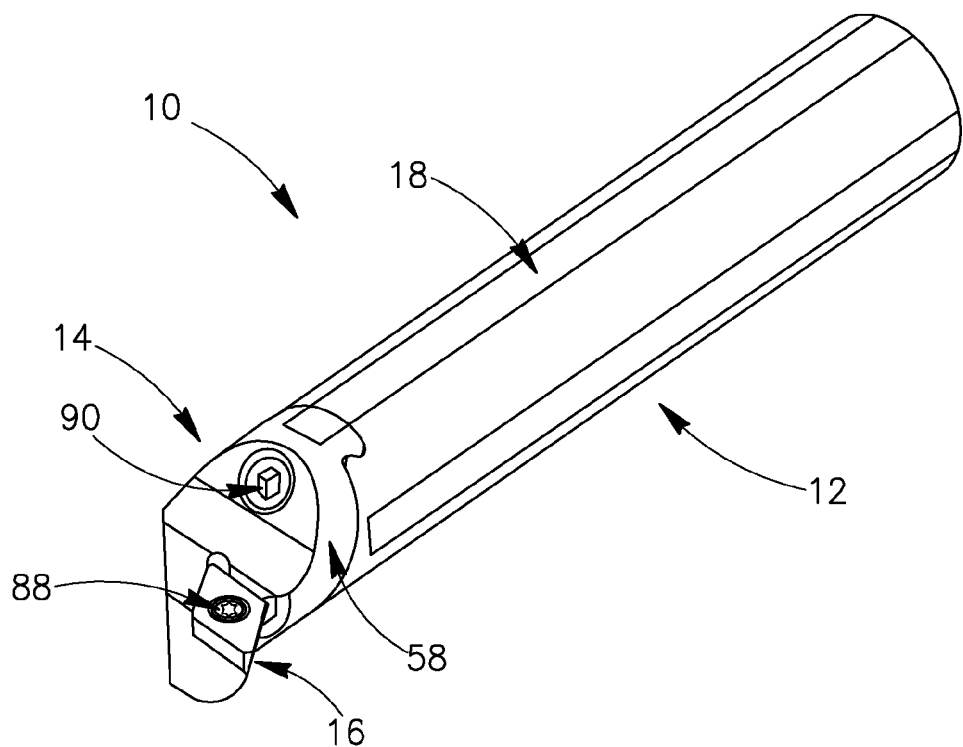
FIG. 1 is a perspective view of a cutting tool assembly in accordance with a first embodiment of the present invention.
Figure 2:
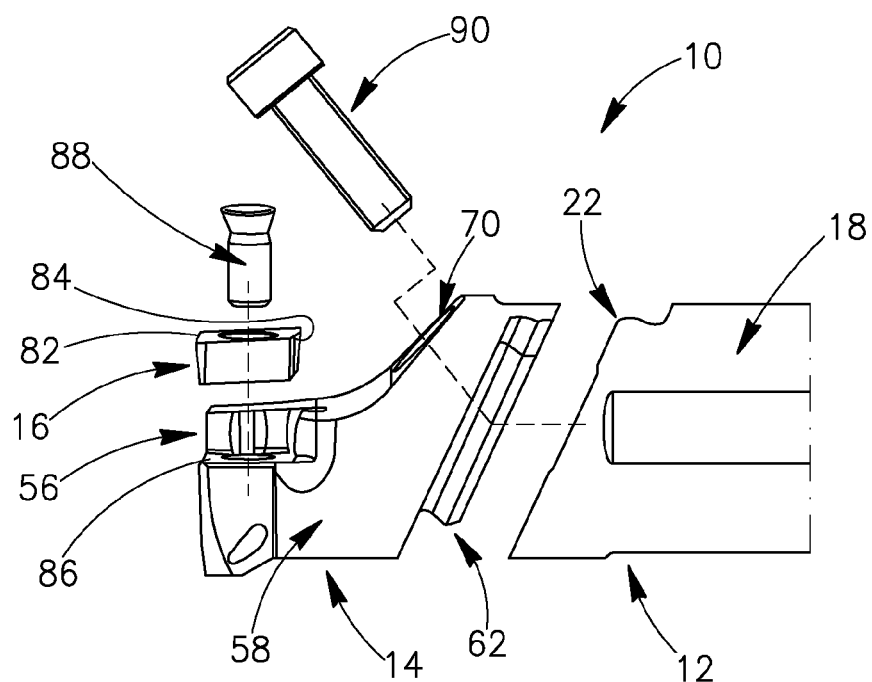
FIG. 2 is an exploded side view of the cutting tool assembly shown in FIG. 1.
Figure 3:
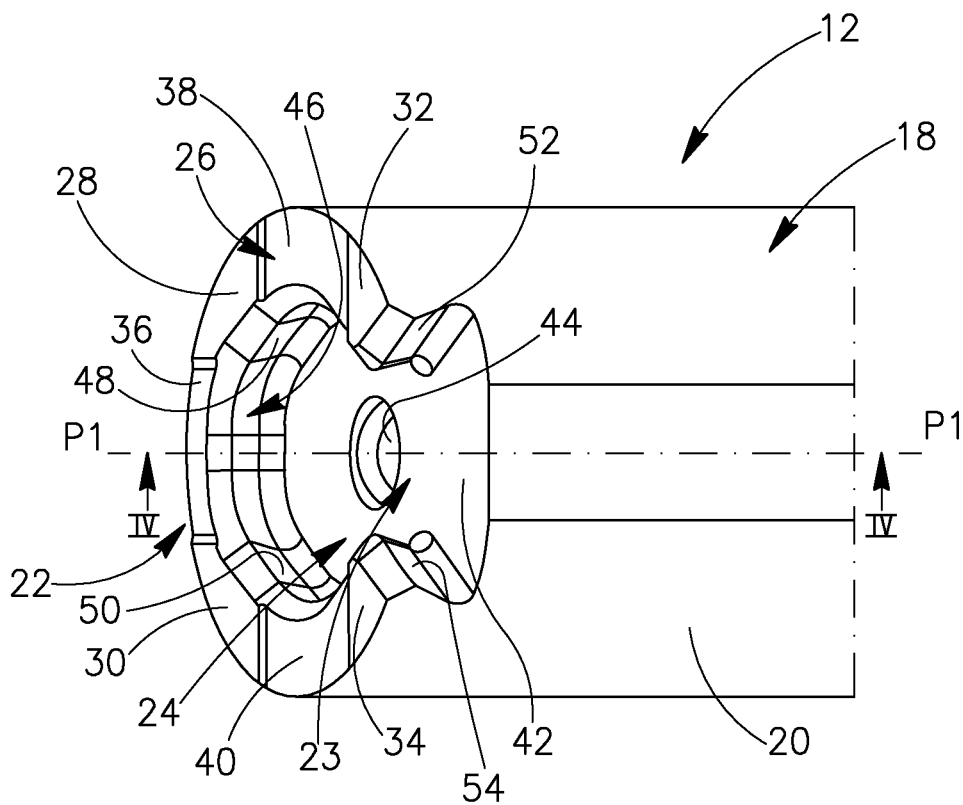
FIG. 3 is a top view of a tool holder in accordance with the first embodiment of the present invention.
Figure 4:
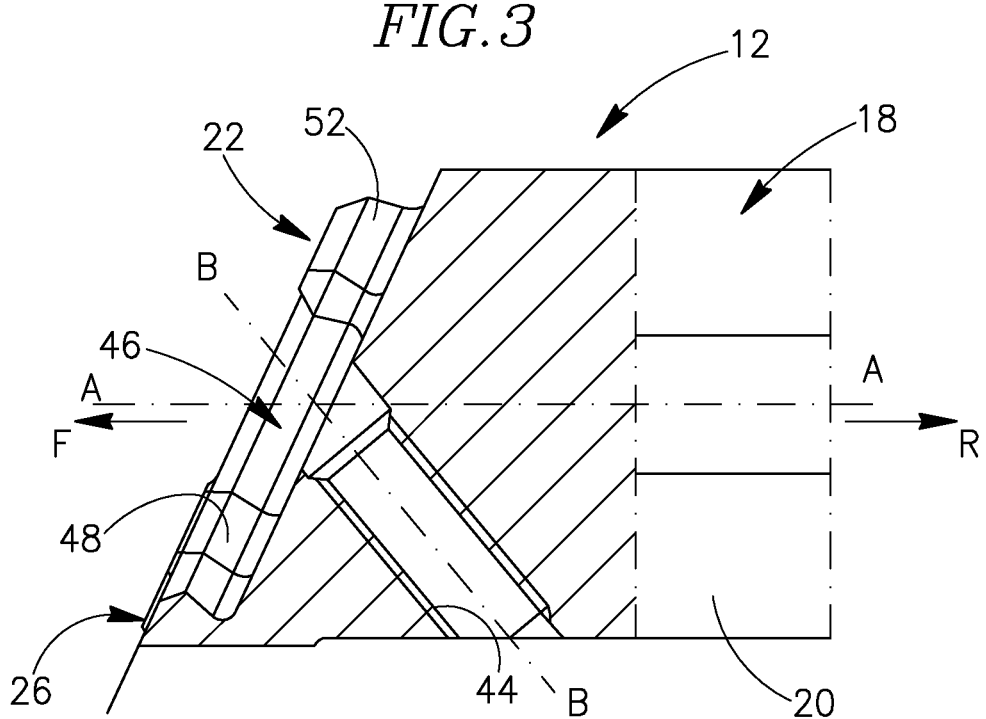
FIG. 4 is a partial cross-sectional view of the tool holder shown in FIG. 3 taken along the line IV-IV.
Figure 5:
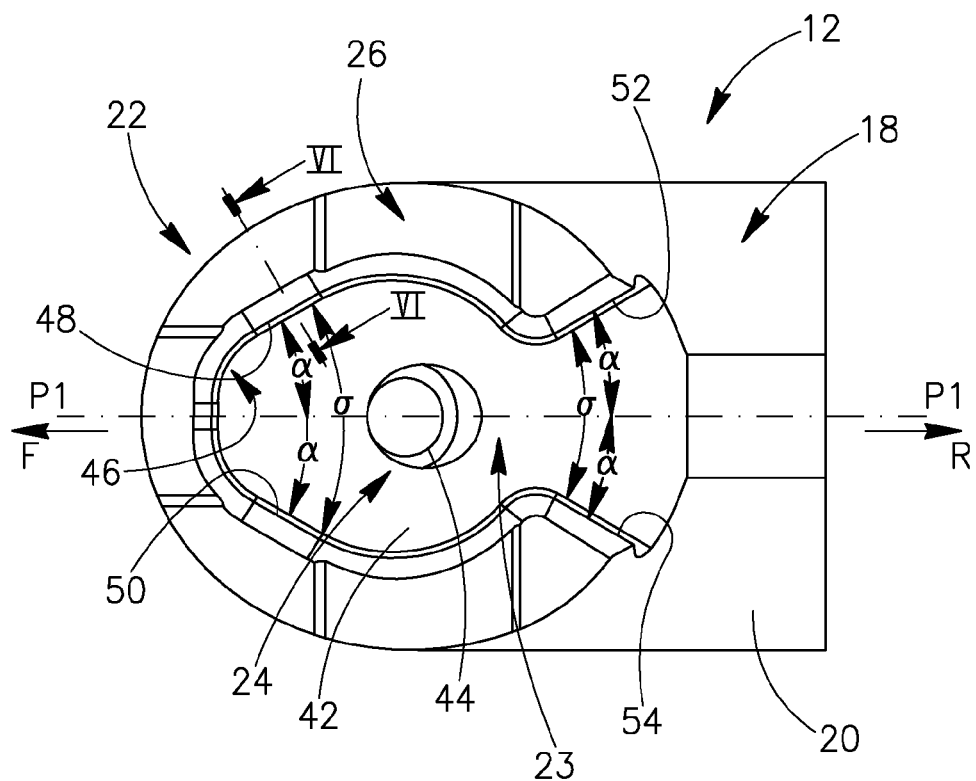
FIG. 5 is a view in the direction of a planar supporting surface of the tool holder shown in FIG. 3.
Figure 6:
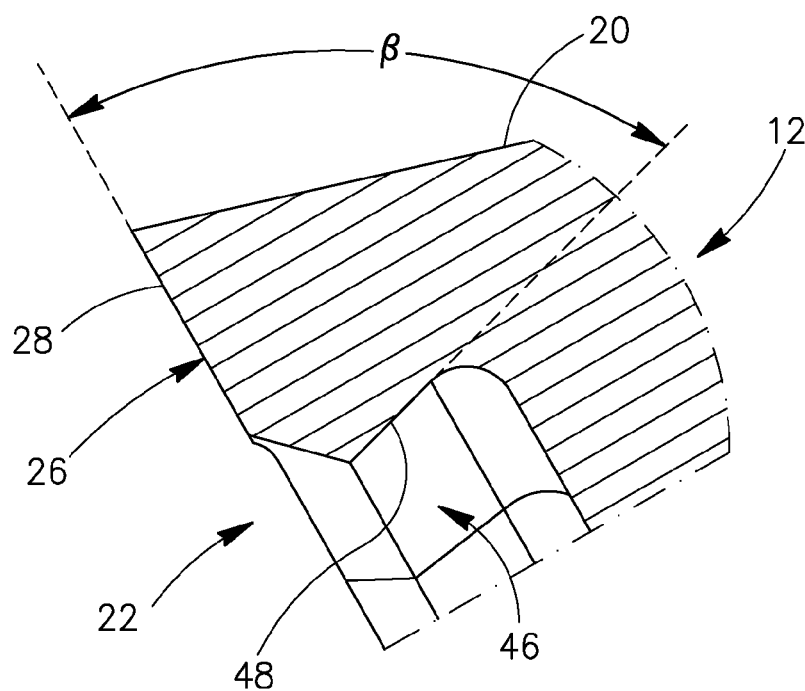
FIG. 6 is a cross-sectional view of the tool holder shown in FIG. 5 taken along the line VI-VI.

Attention is first drawn to FIGS. 1 and 2, showing a cutting tool assembly 10 comprised of a tool holder 12 and a right-hand tool head 14 with a cutting insert 16 removably secured therein. The tool holder 12 and tool head 14 may be manufactured from hardened steel, and the cutting insert 16 may be manufactured by form pressing and sintering a cemented carbide, such as tungsten carbide, and can be coated or uncoated.

According to a first embodiment of the present invention, the tool holder 12 as shown in FIGS. 3 to 6 comprises a generally cylindrical shank portion 18 extending in a forward to rearward direction F, R with a peripheral outer surface 20 and a longitudinal axis A, and a front mating end 22. Although the front mating end 22 may conceivably be male or female, in the first embodiment of the present invention the front mating end 22 includes a female type tool head coupler 23 in the form of a tool head receiving pocket 24 partially bordered by a raised planar supporting surface 26. The supporting surface 26 intersects with the peripheral outer surface 20 of the shank portion 18 and may have four coplanar bearing regions 28, 30, 32, 34 separated by recess regions 36, 38, 40. The tool head receiving pocket 24 is comprised of a pocket lower surface 42 having a threaded screw bore 44 therein with a central axis B, and a pocket peripheral surface 46 adjacent the supporting surface 26 having four abutment wall surfaces 48, 50, 52, 54, each inclined at an internal acute first angle β to the supporting surface 26, where the first, second, third and fourth abutment wall surfaces 48; 50; 52; 54 are adjacent the first, second, third and fourth bearing regions 28; 30; 32; 34, respectively. Each of the abutment wall surfaces 48, 50, 52, 54 may provide an 'undercut' in the forward direction F, and the tool head receiving pocket 24 may be 'open' to the peripheral outer surface 20 of the shank portion 18 where the pocket lower surface 42 and pocket peripheral surface 46 each intersect with the peripheral outer surface 20. The pocket peripheral surface 46 intersects with the peripheral outer surface 20 and comprises abutment wall surfaces 48, 50, 52, 54, each having the same first angle β with the supporting surface 26, which enables quick and efficient manufacturing with reduced tooling requirements.

It should be appreciated that throughout the detailed description and claims, an 'internal angle' refers to an angle between two features as measured internal to the tool holder 12 or tool head 14, whereas an 'external angle' refers to an angle between two features as measured external to the tool holder 12 or tool head 14.

Figure 7:
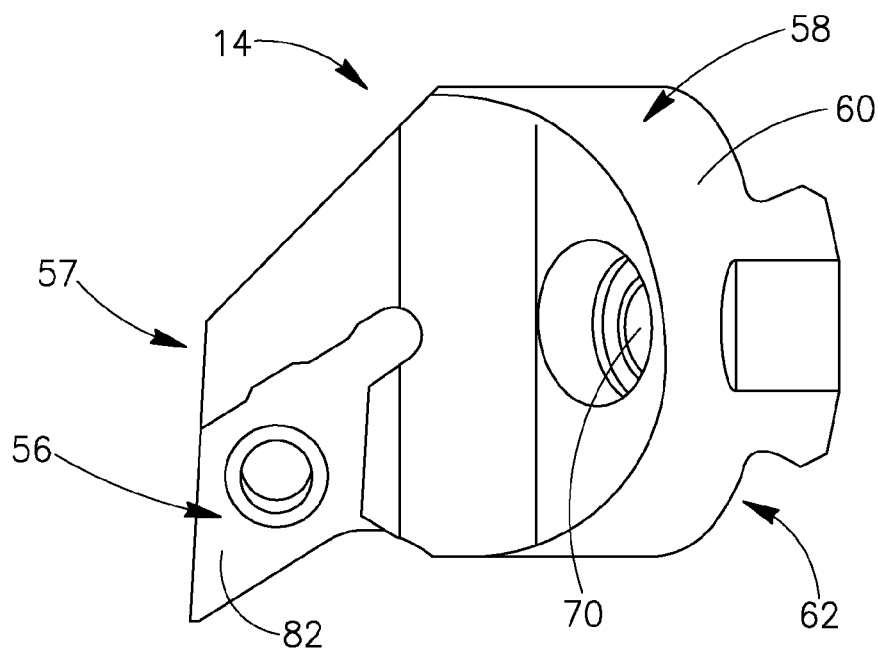
FIG. 7 is a top view of a tool head in accordance with the first embodiment of the present invention.
Figure 8:
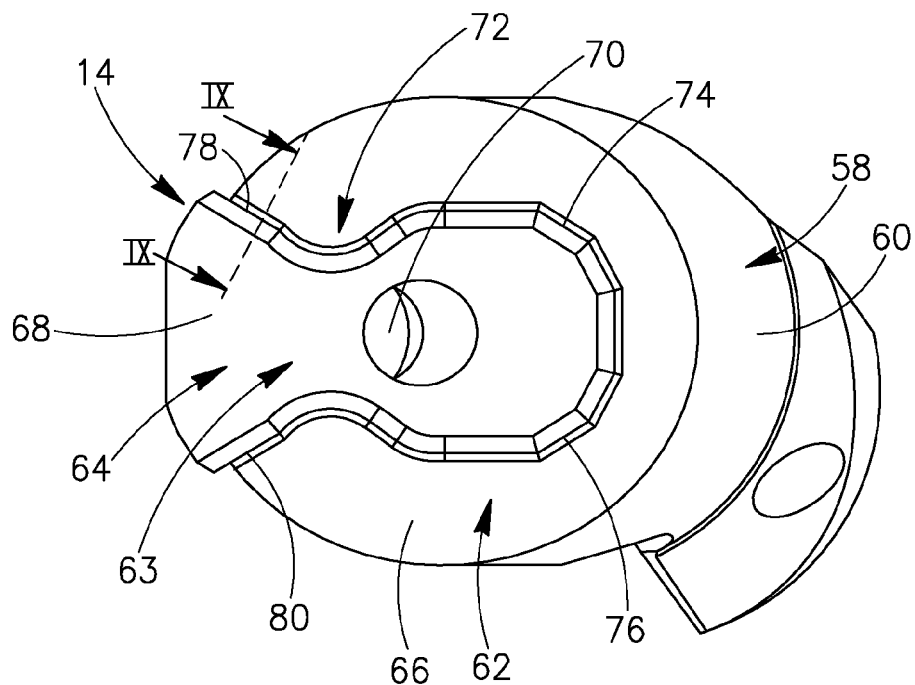
FIG. 8 is a view in the direction of a planar support surface of the tool head shown in FIG. 7.
Figure 9:
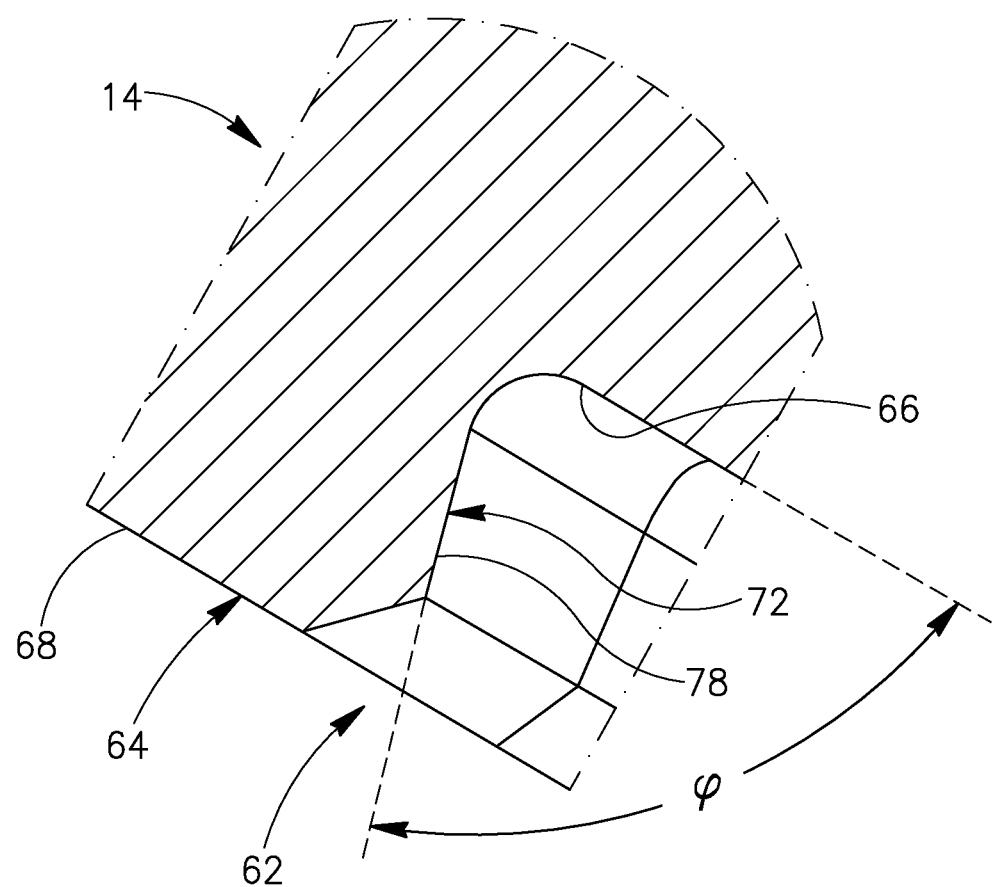
FIG. 9 is a cross-sectional view of the tool holder shown in FIG. 8 taken along the line IX-IX.

According to the first embodiment of the present invention, the tool head 14 as shown in FIGS. 7 to 9 has a cutting insert receiving pocket 56 at a forward insert receiving end 57, a generally cylindrical adapter portion 58 with a peripheral exterior surface 60 having the same diameter as the shank portion 18 of the tool holder 12, and a rear mating end 62. Although the rear mating end 62 may conceivably be male or female, in the first embodiment of the present invention the rear mating end 62 includes a male type tool holder coupler 63 in the form of an engagement protrusion 64 partially bordered by a lower planar support surface 66, the support surface 66 intersecting with the peripheral exterior surface 60 of the adapter portion 58. The engagement protrusion 64 is comprised of a protrusion upper surface 68 having a through bore 70 therein and a protrusion peripheral surface 72 adjacent to the support surface 66 having four abutting wall surfaces 74, 76, 78, 80, each inclined at an external acute second angle φ to the support surface 66. The protrusion upper surface 68 and protrusion peripheral surface 72 may each intersect with the peripheral exterior surface 60 of the adapter portion 58.

As shown in FIGS. 1 and 2, the cutting insert 16 which may be indexable, having more than one main cutting edge 82, 84, is removably secured to a planar lower seat surface 86 of the cutting insert receiving pocket 56 by means of an insert fastening member 88.

As shown in FIGS. 3 to 6, the tool holder 12 has a major plane P1 which contains the longitudinal axis A and also the central axis B of the threaded screw bore 44, and the tool holder 12 has mirror symmetry about the major plane P1. Each of the four abutment wall surfaces 48, 50, 52, 54 are non-coplanar, and when viewed in a direction of the supporting surface 26 form an external acute third angle α with the major plane P1, where the first and third abutment wall surfaces 48; 52 form an external acute fourth angle σ with the second and fourth abutment wall surfaces 50; 54, respectively, and where the fourth angle σ is equal to twice the third angle α, and the first and third abutment wall surfaces 48, 52 and the second and fourth abutment wall surfaces 50, 54 are respectively parallel.

Figure 10:
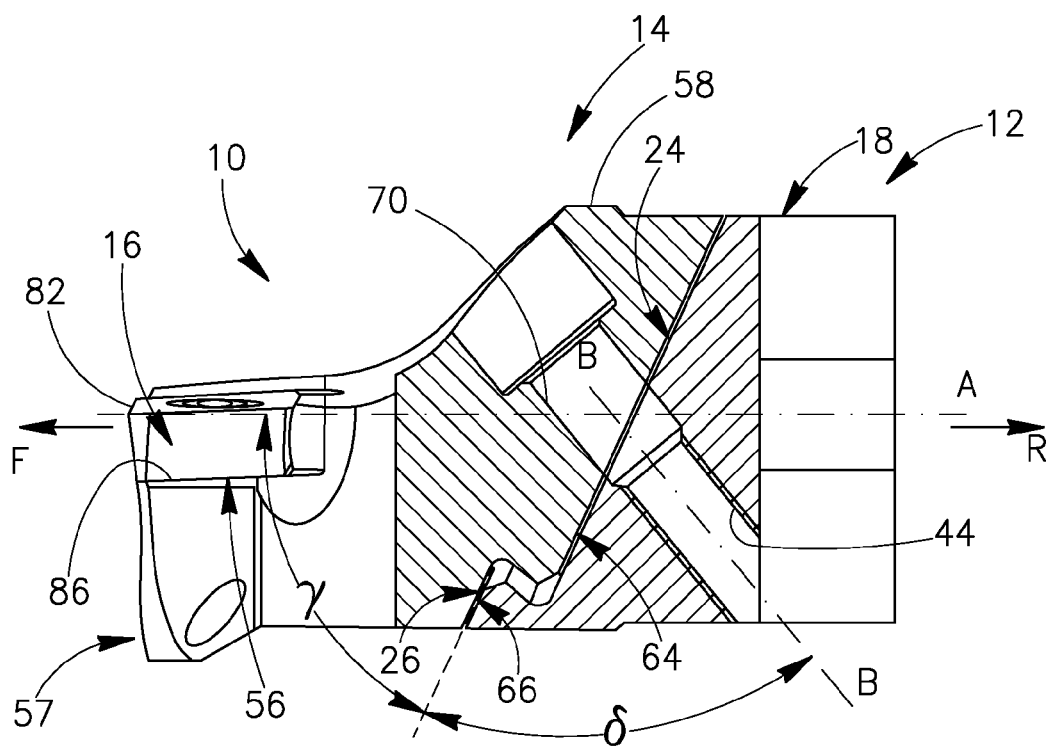
FIG. 10 is a partial cross-sectional side view of the cutting tool assembly (without a fastening screw member) in accordance with the first embodiment of the present invention.
Figure 11:
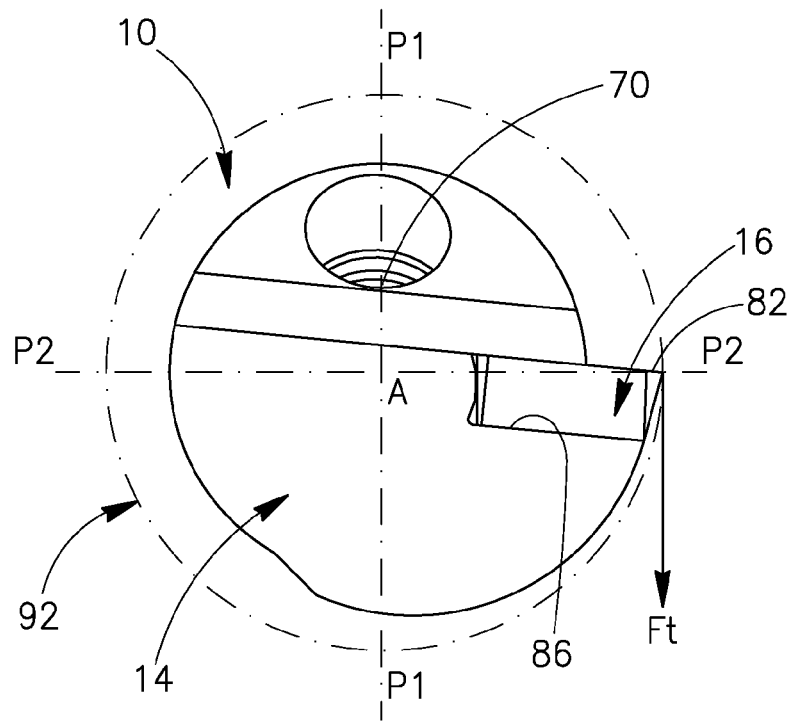
FIG. 11 is an end view of the cutting tool assembly (without the fastening screw member) shown in FIG. 10.
Figure 12:
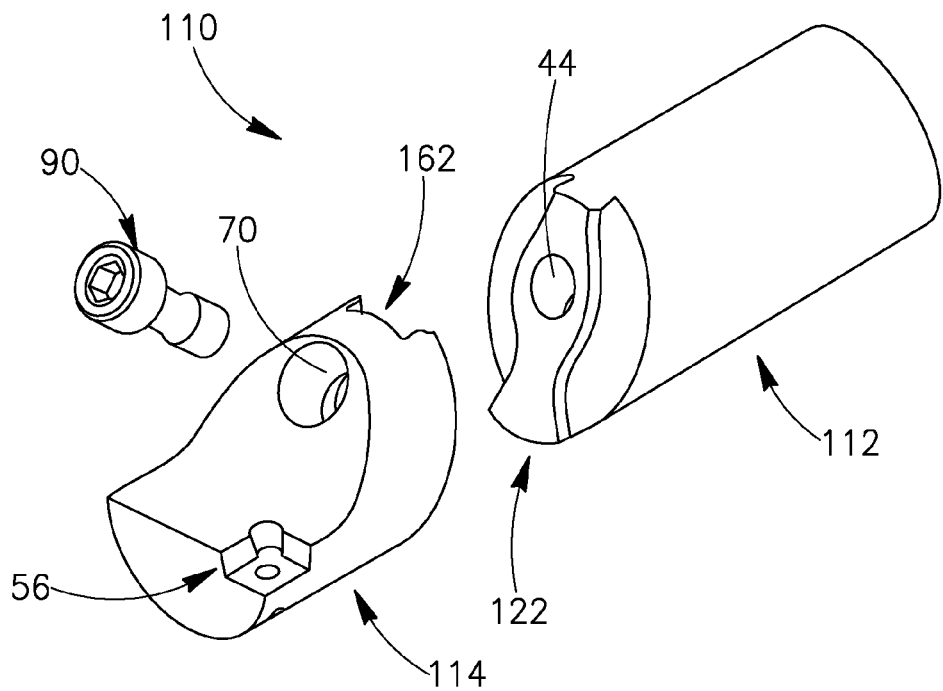
FIG. 12 is an exploded perspective view of a cutting tool assembly in accordance with a second embodiment of the present invention.
Figure 13:
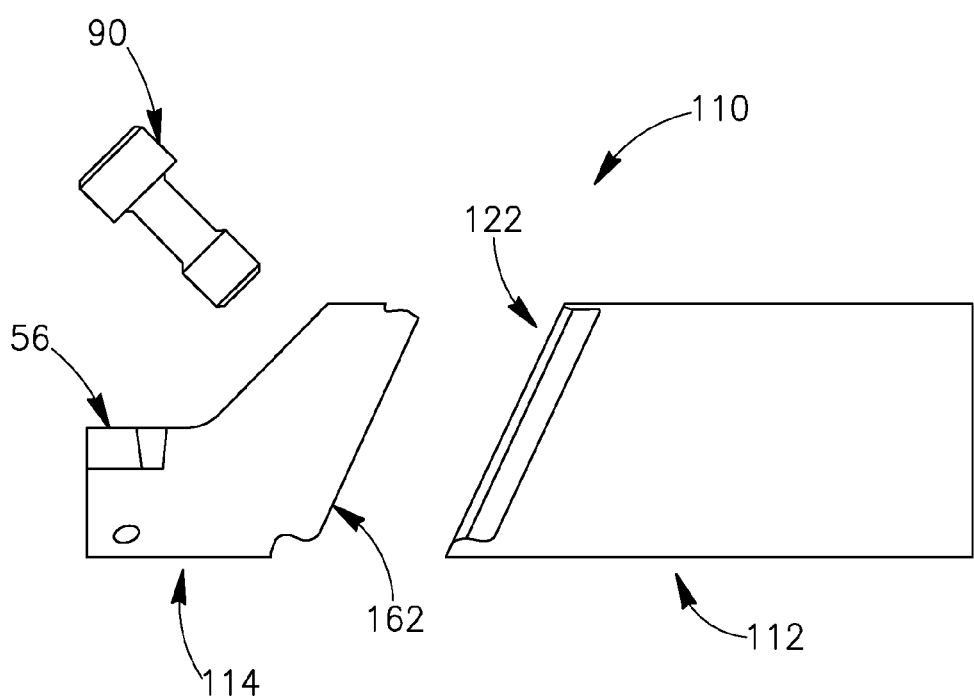
FIG. 13 is an exploded side view of the cutting tool assembly shown in FIG. 12.
Figure 14:
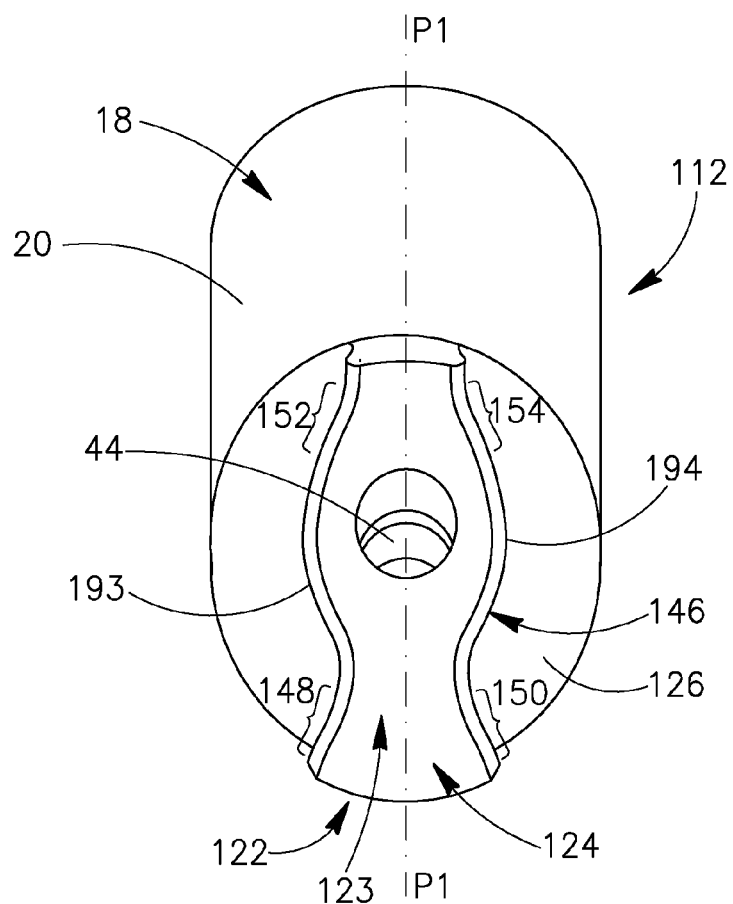
FIG. 14 is a view in the direction of a planar supporting surface of the tool holder in accordance with the second embodiment of the present invention.
Figure 15:
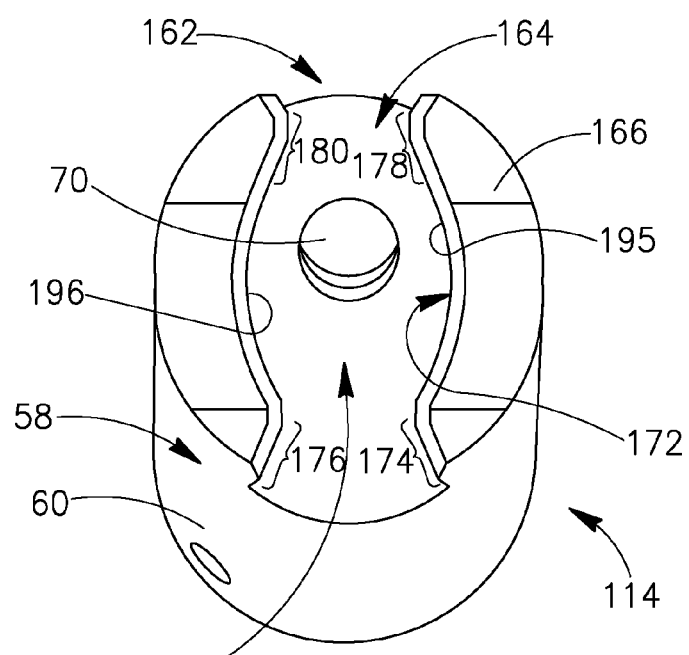
FIG. 15 is a view in the direction of a planar support surface of the tool head in accordance with the second embodiment of the present invention.

Attention is now drawn to FIGS. 10 and 11 showing the cutting tool assembly 10. The engagement protrusion 64 of the rear mating end 62 is initially positioned in the tool head receiving pocket 24 of the front mating head 22 in a single possible orientation until contact is made between the support surface 66 and the supporting surface 26. Then, the tool head 14 is slid into a final assembly position relative to the tool holder 12 where the generally cylindrical adapter portion 58 of the tool head 14 is aligned with the generally cylindrical shank portion 18 of the tool holder 12, and the through bore 70 of the engagement protrusion 64 is aligned with the central axis B of the tool head receiving pocket 24.

As shown in FIGS. 1 and 2, a fastening screw member 90 is then inserted into the through bore 70 and tightened into the threaded screw bore 44 to firmly secure the tool head 14 to the tool holder 12.

In the final assembly position, contact is maintained between the support surface 66 and the four coplanar bearing regions 28, 30, 32, 34 of the supporting surface 26, and the four abutting wall surfaces 74, 76, 78, 80 of the engagement protrusion 64 are in simultaneous contact with the four abutment wall surfaces 48, 50, 52, 54 of the tool head receiving pocket 24, respectively, where the second angle φ formed between each of the first, second, third, and fourth abutting wall surfaces 74; 76; 78; 80 and the support surface 66, is substantially equal to the first angle β formed between each of the first, second, third, and fourth abutment wall surfaces 48; 50; 52; 54 and the supporting surface 26.

Manufacturing tolerances associated with production of the tool holder 12 and the tool head 14, and operational cutting forces acting on the cutting insert 16 and transmitted through the cutting tool assembly 10 may contribute to acceptably reduce the number of abutting surfaces in contact with abutment surfaces to a minimum of three.

In the final assembly position a minor plane P2 containing the longitudinal axis A and intersecting the operative main cutting edge 82 is perpendicular to the major plane P1, and during operation of the cutting tool assembly 10 a main cutting force component Ft tangential to a rotating workpiece 92 is directed parallel to the major plane P1 and perpendicular to the minor plane P2. With the planar supporting surface 26 being perpendicular to the major plane P1 and inclined at an oblique fifth angle γ to the longitudinal axis A, the main cutting force component Ft is transmitted through both the bearing regions 28, 30, 32, 34 of the supporting surface 26 and the abutment wall surfaces 48, 50, 52, 54 of the tool head receiving pocket 24, at the front mating end 22 of the tool holder 12.

Inclination of the planar supporting surface 26 at the oblique fifth angle γ to the longitudinal axis A also increases the 'undercut' provided by the abutment wall surfaces 48, 50, 52, 54 of the tool head receiving pocket 24 in the forward direction F, such that forces directed in a forward direction F tending to separate the tool head 14 from the tool holder 12 are transmitted through both the fastening screw member 90 and the abutment wall surfaces 48, 50, 52, 54 of the tool head receiving pocket 24, at the front mating end 22 of the tool holder 12.

Inclination of the planar supporting surface 26 at the oblique fifth angle γ to the longitudinal axis A also provides a greater supporting surface area in comparison to a supporting surface perpendicular to the longitudinal axis A, for a same diameter shank portion 18.

The tool holder 12 having mirror symmetry about the major plane P1 means that when the right-hand tool head 14 is exchanged for an equivalent left-hand tool head (not shown), the main cutting force component Ft is also transmitted through both the bearing regions 28, 30, 32, 34 of the supporting surface 26 and the abutment wall surfaces 48, 50, 52, 54 of the tool head receiving pocket 24 in a mirror symmetrical way about the major plane P1.

The central axis B of the threaded screw bore 44 extends from the pocket lower surface 42 in a direction transverse to the longitudinal axis A and is inclined at an oblique sixth angle δ to the planar supporting surface 26, ensuring that a lateral component of a tightening force from the fastening screw member 90 is directed between the four abutting wall surfaces 74, 76, 78, 80 of the rear mating end 62 of the tool head 14 and the four abutment wall surfaces 48, 50, 52, 54 of the front mating end 22 of the tool holder 12. Also, the central axis B of the threaded screw bore 44 intersects with the minor plane P2, ensuring that a component of the tightening force from the fastening screw member 90 is directed in the same direction as the main cutting force component, Ft.

A second embodiment of the present invention will now be described referring to FIGS. 12 to 15, showing a cutting tool assembly 110 comprising a tool holder 112 having a front mating end 122 and a tool head 114 having a rear mating end 162.

Some elements of the cutting tool assembly 110 are common to those of the first embodiment and are shown in FIGS. 1 to 11, and therefore description of these elements will be omitted for simplicity.

It should also be understood that some elements from the rear mating end 62 of the tool head 14 in the first embodiment will now be associated with the front mating end 122 of the tool holder 112 in the second embodiment, and some elements from the front mating end 22 of the tool holder 12 in the first embodiment will now be associated with the rear mating end 162 of the tool head 114 in the second embodiment.

The front mating end 122 of the tool holder 112 includes a male type tool head coupler 123 in the form of an engagement protrusion 124 partially bordered by a lower planar supporting surface 126, and the rear mating end 162 of the tool head 114 includes a female type tool holder coupler 163 in the form of a tool holder receiving pocket 164 partially bordered by a raised planar support surface 166.

The engagement protrusion 124 may have a protrusion peripheral surface 146 including two separate protrusion peripheral portions 193, 194, where each protrusion peripheral portion 193, 194 is delimited by the peripheral outer surface 20 of the shank portion 18 of the tool holder 112 and has two abutment wall surfaces 148, 152 and 150, 154, respectively.

The tool holder receiving pocket 164 may have a pocket peripheral surface 172 including two separate pocket peripheral portions 195, 196, where each pocket peripheral portion 195, 196 is delimited by the peripheral exterior surface 60 of the adapter portion 58 of the tool head 114 and has two abutting wall surfaces 174, 178 and 176, 180, respectively.

The engagement protrusion 124 of the front mating end 122 is initially positioned in the tool holder receiving pocket 164 of the rear mating end 162 in a single possible orientation until contact is made between the supporting surface 126 and the support surface 166. Then, the tool head 114 is then slid into a final assembly position relative to the tool holder 112.

Although the present invention has been described to a certain degree of particularity, it should be understood that various alterations and modifications could be made without departing from the spirit or scope of the invention as hereinafter claimed.

What is claimed is:

1. A cutting tool assembly (10, 110) for machining a workpiece (92) comprising:
   a tool holder (12, 112) having a longitudinal axis A extending in a forward to rearward direction (F, R) having a peripheral outer surface (20) and a front mating end (22, 122), and
   a tool head (14, 114) having a rear mating end (62, 162) and a forward insert receiving end (57) with a cutting insert (16) removably secured therein,
   the front mating end (22, 122) of the tool holder (12, 112) comprising:
   a male or female type tool head coupler (23, 123) having a threaded screw bore (44) therein with a central axis B, and a plurality of abutment wall surfaces (48, 148; 50, 150; 52, 152; 54, 154) adjacent a planar supporting surface (26, 126), the rear mating end (62, 162) of the tool head (14, 114) comprising:

a male or female type tool holder coupler (63, 163) having a through bore (70) therein, and a plurality of adjacent abutting wall surfaces (74, 174; 76, 176; 78, 178; 80, 180) adjacent a planar support surface (66, 166), wherein the support surface (66, 166) is in contact with the supporting surface (26, 126), at least three of the plurality of abutting wall surfaces (74, 174; 76, 176; 78, 178; 80, 180) are in contact with at least three of the plurality of abutment wall surfaces (48, 148; 50, 150; 52, 152; 54, 154), and a fastening screw member (90) extends through the through bore (70) and engages the threaded screw bore (44), and wherein the at least three of the plurality of abutment wall surfaces (48, 148; 50, 150; 52, 152; 54, 154) are non-coplanar and inclined at an acute third angle α to a major plane P1 containing the longitudinal axis A, when viewed in a direction of the supporting surface (26, 126).

2. The cutting tool assembly (10) according to claim 1, wherein the tool head coupler (23) is a female type in the form of a tool head receiving pocket (24) and the tool holder coupler (63) is a male type in the form of an engagement protrusion (64).

3. The cutting tool assembly (10) according to claim 2, wherein the planar supporting surface (26) is a raised surface at least partially bordering the tool head receiving pocket (24).

4. The cutting tool assembly (10) according to claim 2, wherein the planar support surface (66) is a lower surface at least partially bordering the engagement protrusion (64).

5. The cutting tool assembly (10) according to claim 2, wherein the tool head receiving pocket (24) has a pocket lower surface (42) intersecting the peripheral outer surface (20).

6. The cutting tool assembly (10) according to claim 2, wherein there is a single possible orientation of the engagement protrusion (64) within the tool head receiving pocket (24).

7. The cutting tool assembly (10, 110) according to claim 1, wherein two of the at least three of the plurality of abutment wall surfaces (48, 148; 50, 150; 52, 152; 54, 154) are parallel.

8. The cutting tool assembly (10, 110) according to claim 1, wherein two of the at least three of the plurality of abutment wall surfaces (48, 148; 50, 150; 52, 152; 54, 154) form a fourth angle σ when viewed in a direction of the supporting surface (26, 126), and wherein the fourth angle σ is equal to twice the third angle α.

9. The cutting tool assembly (10, 110) according to claim 1, wherein the at least three of the plurality of abutment wall surfaces (48, 148; 50, 150; 52, 152; 54, 154) are inclined at an acute first angle β to the planar supporting surface (26, 126).

10. The cutting tool assembly (10, 110) according to claim 9, wherein the at least three of the plurality of abutting wall surfaces (74, 174; 76, 176; 78, 178; 80, 180) are inclined at an acute second angle φ to the planar support surface (66, 166), and wherein the second angle φ is substantially equal to the first angle β.

11. The cutting tool assembly (10, 110) according to claim 1, wherein the planar supporting surface (26, 126) is inclined at an oblique fifth angle γ to the longitudinal axis A.

12. The cutting tool assembly (10, 110) according to claim 1, wherein the planar supporting surface (26, 126) intersects with the peripheral outer surface (20) of the tool holder (12, 112).

13. The cutting tool assembly (10, 110) according to claim 1, wherein four abutting wall surfaces (74, 174; 76, 176; 78, 178; 80, 180) are in contact with four abutment wall surfaces (48, 148; 50, 150; 52, 152; 54, 154).

14. The cutting tool assembly (10, 110) according to claim 1, wherein the tool holder (12, 112) has mirror symmetry about the major plane P1.

15. The cutting tool assembly (10, 110) according to claim 1, wherein the central axis B of the threaded screw bore (44) intersects the major plane P1 and extends in a direction transverse to the longitudinal axis A.

16. The cutting tool assembly (10, 110) according to claim 1, wherein the central axis B of the threaded screw bore (44) is inclined at an oblique sixth angle δ to the planar supporting surface (26, 126).

17. The cutting tool assembly (10, 110) according to claim 1, wherein a minor plane P2 containing the longitudinal axis A and intersecting an operative main cutting edge (82) of the cutting insert (16) is perpendicular to the major plane P1.

18. The cutting tool assembly (10, 110) according to claim 17, wherein the central axis B intersects the minor plane P2.

19. The cutting tool assembly (10) according to claim 1, wherein the planar supporting surface (26) is comprised of four coplanar bearing regions (28, 30, 32, 34).

20. The cutting tool assembly (110) according to claim 1, wherein the tool head coupler (123) is a male type in the form of an engagement protrusion (124) and the tool holder coupler (163) is a female type in the form of a tool holder receiving pocket (164).

21. The cutting tool assembly (110) according to claim 20, wherein the engagement protrusion (124) has a protrusion peripheral surface (146) comprising two separate protrusion peripheral portions (193, 194).

22. The cutting tool assembly (110) according to claim 21, wherein each protrusion peripheral portion (193, 194) is delimited by the peripheral outer surface (20) and has two abutment wall surfaces (148, 152 and 150, 154).

23. A tool holder (12, 112) having a longitudinal axis A extending in a forward to rearward direction (F, R) having a peripheral outer surface (20) and a front mating end (22, 122), the front mating end (22, 122) of the tool holder (12, 112) comprising:

a male or female type tool head coupler (23, 123) having a threaded screw bore (44) therein, and a plurality of abutment wall surfaces (48, 148; 50, 150; 52, 152; 54, 154) adjacent a planar supporting surface (26, 126), wherein at least three of the plurality of abutment wall surfaces (48, 148; 50, 150; 52, 152; 54, 154) are non-coplanar and inclined at an acute third angle α to a major plane P1 containing the longitudinal axis A, when viewed in a direction of the supporting surface (26, 126).

24. The tool holder (12, 112) according to claim 23, wherein two of the at least three of the plurality of abutment wall surfaces (48, 148; 50, 150; 52, 152; 54, 154) are parallel.

25. The tool holder (12, 112) according to claim 23, wherein the at least three of the plurality of abutment wall surfaces (48, 148; 50, 150; 52, 152; 54, 154) are inclined at an acute first angle β to the planar supporting surface (26, 126).

26. The tool holder (12, 112) according to claim 23, wherein the planar supporting surface (26, 126) is inclined at an oblique fifth angle γ to the longitudinal axis A.

* * * * *